(12) United States Patent
Tanaka et al.

(10) Patent No.: US 9,017,861 B2
(45) Date of Patent: Apr. 28, 2015

(54) NONAQUEOUS ELECTROLYTE SECONDARY BATTERY

(71) Applicant: Kabushiki Kaisha Toshiba, Minato-ku, Tokyo (JP)

(72) Inventors: Masanori Tanaka, Saku (JP); Hidesato Saruwatari, Saku (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 168 days.

(21) Appl. No.: 13/798,047

(22) Filed: Mar. 12, 2013

(65) Prior Publication Data

US 2013/0244090 A1  Sep. 19, 2013

(30) Foreign Application Priority Data

Mar. 15, 2012 (JP) .................. 2012-059099

(51) Int. Cl.
| | |
|---|---|
| *H01M 2/04* | (2006.01) |
| *H01M 2/10* | (2006.01) |
| *H01M 10/50* | (2006.01) |
| *H01M 2/02* | (2006.01) |
| *H01M 10/04* | (2006.01) |

(52) U.S. Cl.
CPC ............ *H01M 2/0282* (2013.01); *H01M 10/04* (2013.01); *Y02T 10/7011* (2013.01); *Y02E 60/122* (2013.01)

(58) Field of Classification Search
CPC . H01M 10/50; H01M 2/0277; H01M 2/0282; H01M 2/029; H01M 10/04; H01M 2/10; F01R 9/00; H02G 3/00; Y02T 10/7011; Y02E 60/122

USPC .......................................... 429/186, 120, 208
See application file for complete search history.

(56) References Cited

U.S. PATENT DOCUMENTS 6,743,546 B1 * 6/2004 Kaneda et al. ................ 429/127
7,790,313 B2 * 9/2010 Lee ............................... 429/208
(Continued)

FOREIGN PATENT DOCUMENTS

| CN | 101079502 A | 11/2007 |
|---|---|---|
| CN | 102064309 A | 5/2011 |
| EP | 0 522 981 A1 | 1/1993 |

(Continued)

OTHER PUBLICATIONS

Extended European Search Report (EESR) dated Jul. 29, 2013 (in English) in counterpart European Application No. 13158747.9.
(Continued)

*Primary Examiner* — Patrick Ryan
*Assistant Examiner* — Kiran Quraishi
(74) *Attorney, Agent, or Firm* — Holtz, Holtz, Goodman & Chick PC (57) ABSTRACT

In one embodiment, a nonaqueous electrolyte secondary battery includes an electrode group, a battery container, an insulation member, and a nonaqueous electrolyte solution. The electrode group includes a positive electrode, a negative electrode and a separator disposed between the positive electrode and the negative electrode. The insulation member, which insulates the positive electrode and the negative electrode from the battery container and absorbs vibration, includes a resin and an inorganic material and has a bending elastic modulus between 600 MPa and 1,500 MPa, a specific heat between 0.25 cal/° C.·g and 0.40 cal/° C.·g, and a thermal conductivity between 0.3 W/m·K and 0.6 W/m·K.

10 Claims, 3 Drawing Sheets

(56) References Cited

U.S. PATENT DOCUMENTS

2003/0008205 A1    1/2003   Horie et al.
2011/0287296 A1   11/2011   Sabi et al.

FOREIGN PATENT DOCUMENTS

| | | |
|---|---|---|
| EP | 1 818 998 A2 | 8/2007 |
| EP | 1 858 107 A1 | 11/2007 |
| JP | 08-255615 A | 10/1996 |
| JP | 2008-226785 A | 9/2008 |
| JP | 2008-305646 A | 12/2008 |

OTHER PUBLICATIONS

Chinese Office Action dated Dec. 23, 2014, issued in counterpart Chinese Application No. 201310082632.2.

* cited by examiner

NONAQUEOUS ELECTROLYTE SECONDARY BATTERY

CROSS-REFERENCE TO RELATED APPLICATIONS

This application is based upon and claims the benefit of priority from Japanese Patent Application No. 2012-059099, filed Mar. 15, 2012, the entire contents of which are incorporated herein by reference.

FIELD

Embodiments described herein relate generally to a nonaqueous electrolyte secondary battery.

BACKGROUND

As a power source for a hybrid vehicle and an electric vehicle such as a plug-in electric vehicle which have been widely accepted in recent years, a rectangular rechargeable nonaqueous electrolyte secondary battery, for example, a lithium ion secondary battery have been mainly used. The lithium ion secondary battery comprises an electrode group in which a positive electrode and a negative electrode are wound or stacked with a separator interposed, a battery container (battery case) accommodating the electrode group, and a nonaqueous electrolyte solution in which the electrode group accommodated in the battery container is immersed. The battery container is available from, for example, aluminum or aluminum alloy and is rectangular in shape.

A power source for an electric vehicle needs a nonaqueous electrolyte secondary battery strong enough to withstand shock and vibration. For this purpose, a vibration absorbing member is used.

A lithium ion secondary battery is configured such that, for example, members using an insulation resin are disposed around leads for connecting a positive terminal (positive electrode) and a negative terminal (negative electrode) fixed on a cover of a battery container with a positive electrode and a negative electrode of an electrode group, providing the functions of vibration absorption and insulation from the battery container. However, if a brittle material or a low strength material is used as the vibration absorbing member, shock and vibration cause breaking of the lead. Therefore, a material with an appropriately low elastic modulus has to be used. However, since materials with the low elastic modulus are often high in specific heat, there is a problem that frictional heat generated by vibration is likely to accumulate, reducing the material strength by heat generated, resulting in poor resistance to shock and vibration.

DETAILED DESCRIPTION

In general, according to one embodiment, a nonaqueous electrolyte secondary battery comprises an electrode group comprising a positive electrode, a negative electrode and a separator disposed between the positive electrode and the negative electrode, a battery container in which the electrode group is accommodated, an insulation member which insulates the positive electrode and the negative electrode of the electrode group from the battery container and absorbs vibration, and a nonaqueous electrolyte solution in which the electrode group accommodated in the battery container is immersed. The insulation member includes a resin and an inorganic material, the insulation member having a bending elastic modulus of 600 MPa or more and 1,500 MPa or less, a specific heat of 0.25 cal/° C.·g or more and 0.40 cal/° C.·g or less, and a thermal conductivity of 0.3 W/m·K or more and 0.6 W/m·K. or less.

Hereinafter, a nonaqueous electrolyte secondary battery according to the embodiment will be described with reference to FIGS. 1 to 4.

Figure 1:
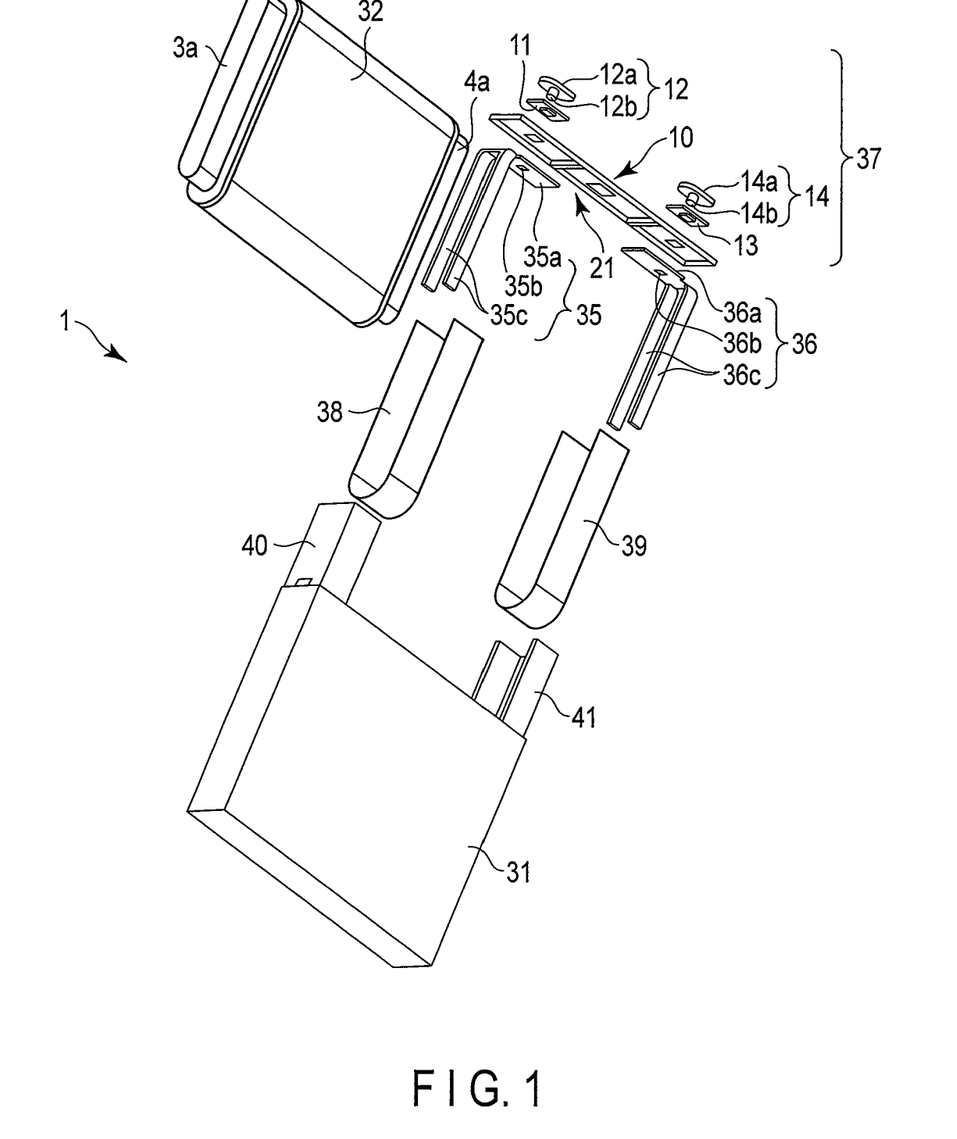
FIG. 1 is an exploded perspective view showing a nonaqueous electrolyte secondary battery according to an embodiment.

FIG. 1 is an exploded perspective view showing a nonaqueous electrolyte secondary battery according to an embodiment. The nonaqueous electrolyte secondary battery 1 illustrated in FIG. 1 is a rectangular battery and schematically has a structure in which a flat electrode group 32 is accommodated in a rectangular battery container 31, the battery container 31 is sealed with a sealing member 37, and the electrode group 32 accommodated in the battery container 31 is immersed in the nonaqueous electrolyte solution (not illustrated).

Figure 2:
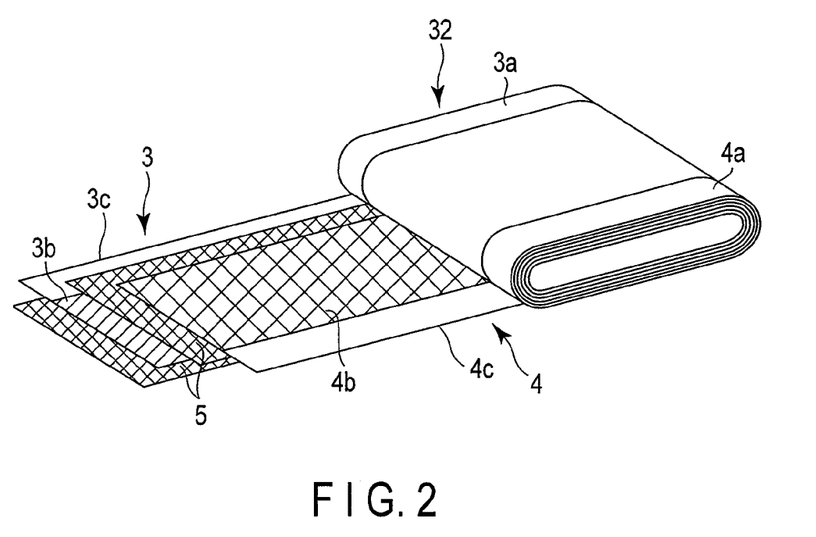
FIG. 2 is an exploded perspective view showing an electrode group of the nonaqueous electrolyte secondary battery according to the embodiment.

FIG. 2 is an exploded perspective view showing an electrode group. As illustrated in FIG. 2, a flat electrode group 32 is configured to wind a sheet-shaped positive electrode 3 and a sheet-shaped negative electrode 4 in a spiral form while interposing a separator 5 therebetween. More specifically, the electrode group 32 is formed by winding in a spiral form the positive electrode 3, the negative electrode 4, and the separator 5 interposed therebetween, followed by pressing the whole to the square shape the cross-section of which geometrically corresponds to the cross-section of the battery container 31. The separator 5 is disposed on an outermost layer (outermost periphery) of the electrode group 32. The positive electrode 3 includes a strip-shaped positive electrode current collector made of, for example, a metal foil, a positive electrode tab 3a consisting of an end portion parallel to a long side 3c of the positive electrode current collector and a positive electrode active material layer 3b stacked on the positive electrode current collector excluding at least the portion of the positive electrode tab 3a. The negative electrode 4 includes a strip-shaped negative electrode current collector made of, for example, a metal foil, a negative electrode tab 4a consisting of an end portion parallel to a long side 4c of the negative electrode current collector and a negative electrode active material layer 4b stacked on the negative electrode current collector excluding at least the portion of the negative electrode tab 4a.

A positive electrode 3, a separator 5, and a negative electrode 4 are wound around the winding axis of an electrode group such that the position of the positive electrode 3 is offset from the position of the negative electrode 4 so that a positive electrode tab 3a is protruded from the separator 5 in one direction, whereas the negative electrode tab 4a is protruded from the separator 5 in the opposite direction. As illustrated in FIGS. 1 and 2, such winding allows for protruding, from one end face of an electrode group 32, the positive electrode tab 3a made by stacking the positive electrode current collectors and protruding, from other end face of the electrode group 32, the negative electrode tab 4a made by stacking the negative electrode current collectors. A nonaqueous electrolyte solution (not illustrated) is retained in the electrode group 32.

As illustrated in FIG. 1, a positive terminal (positive electrode) 12 and a negative terminal (negative electrode) 14 are attached via gaskets 11, 13 separately to a top surface of a cover 10 of a battery container 31. An insulator 21 is provided on an inner surface (undersurface) of the cover 10. A sealing member 37 comprises such a cover 10, a positive terminal (positive electrode) 12, a negative terminal (negative electrode) 14, the gaskets 11 and 13, and the insulator 21.

A positive electrode lead 35 comprises a connection plate 35a with a through hole 35b and a current collector 35c which bifurcates from the connection plate to extend downwards. A negative electrode lead 36 similarly comprises a connection plate 36a with a through hole 36b and a current collector 36c which bifurcates from the connection plate to extend downwards.

Figure 3:
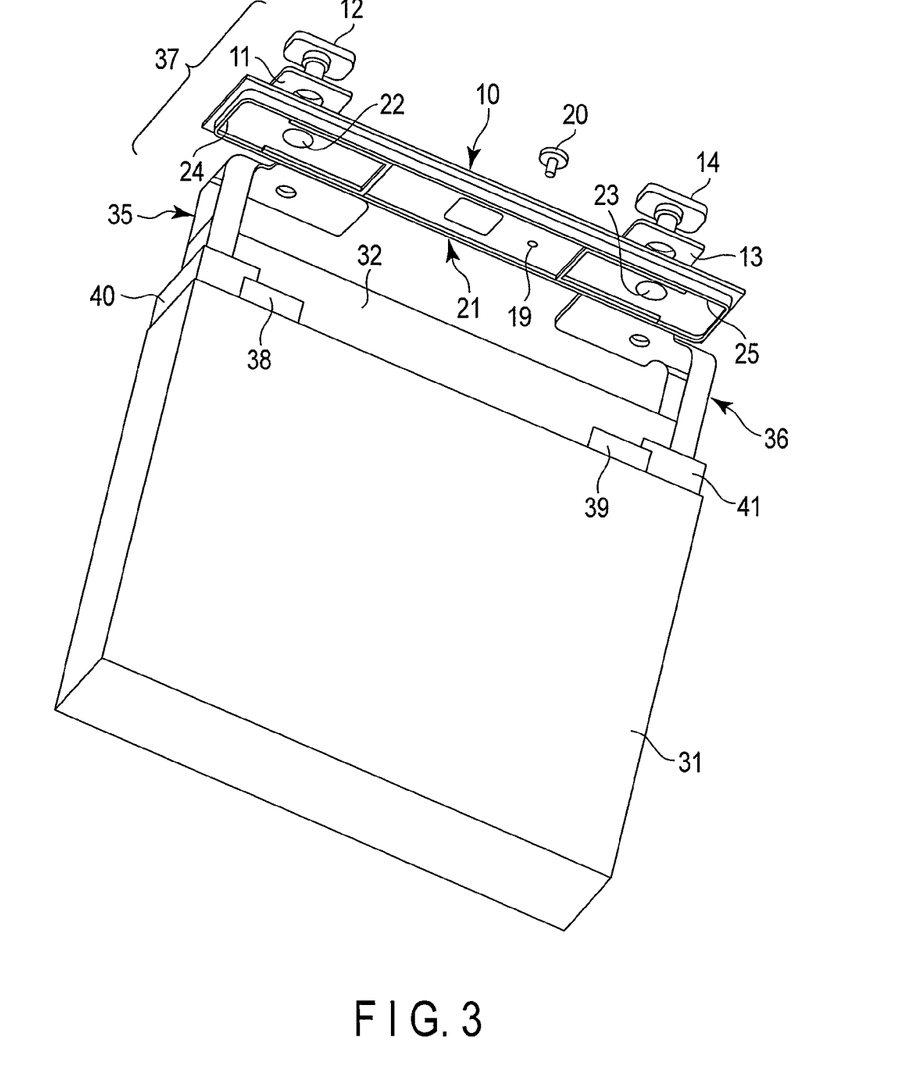
FIG. 3 is an exploded perspective view of the nonaqueous electrolyte secondary battery illustrated in FIG. 1 as viewed from below.

FIG. 3 is an exploded perspective view of a nonaqueous electrolyte secondary battery as viewed from below. As illustrated in FIG. 3, an insulator 22 constituting a sealing member 37 includes a first recessed portion 24 and a second recessed portion 25 on the backside. A connection plate 35a of a positive electrode lead 35 is attached to the inside of the first recessed portion 24 and a connection plate 36a of a negative electrode lead 36 is attached to the inside of the second recessed portion 25. A through hole 35b of the positive electrode lead 35 is communicated with a first through hole 22 of an insulator 21 and a through hole 36b of a negative electrode lead 36 is communicated with a second through hole 23 of the insulator 21.

A positive terminal (positive electrode) 12 is connected through a crimp connection with a cover 10, an insulator 21, and a positive electrode lead 35, and thereby jointed to these members. Then at least a portion of the contacting part between the positive terminal 12 and the positive electrode lead 35 is welded. Alternatively, the positive terminal 12, the cover 10 and the positive electrode lead 35 are jointed together by welding at least a portion of each of the contacting part between the positive terminal 12 and the cover 10 and the connecting part between the positive terminal 12 and the positive electrode lead 35. A negative terminal (negative electrode) 14 is connected through a crimp connection with the cover 10, the insulator 21, and a negative electrode lead 36, and thereby jointed to these members. Then at least a portion of the contacting part between the negative terminal 14 and the negative electrode lead 36 is welded. Alternatively, the negative terminal 14, the cover 10 and the negative electrode lead 36 are jointed together by welding at least a portion of each of the contacting part between the negative terminal 14 and the cover 10 and the connecting part between the negative terminal 14 and the negative electrode lead 36. Thus, the positive terminal 12 is electrically connected with a positive electrode lead 35 and a negative terminal (negative electrode) 14 is electrically connected with a negative electrode lead 36.

A positive electrode lead 35 is connected with a positive electrode tab 3a of an electrode group 32 by sandwiching the periphery thereof between bifurcated current collectors 35c and a negative electrode lead 36 is connected with a negative electrode tab 4a of the electrode group 32 by sandwiching the periphery thereof between bifurcated current collectors 36c. Thus, the positive electrode lead 35 is electrically connected with a positive electrode tab 3a of the electrode group 32 and the negative electrode lead 36 is electrically connected with a negative electrode tab 4a of the electrode group 32.

A connecting portion between a positive electrode lead 35 and a positive electrode tab 3a and a connecting portion between a negative electrode lead 36 and a negative electrode tab 4a are covered with insulation members 40, 41 which also serve as a shock and vibration absorbing material. Insulation members (shock and vibration absorbing material) 40, 41 are fixed by double fold insulation tapes 38, 39 to an electrode group 32.

Figure 4:
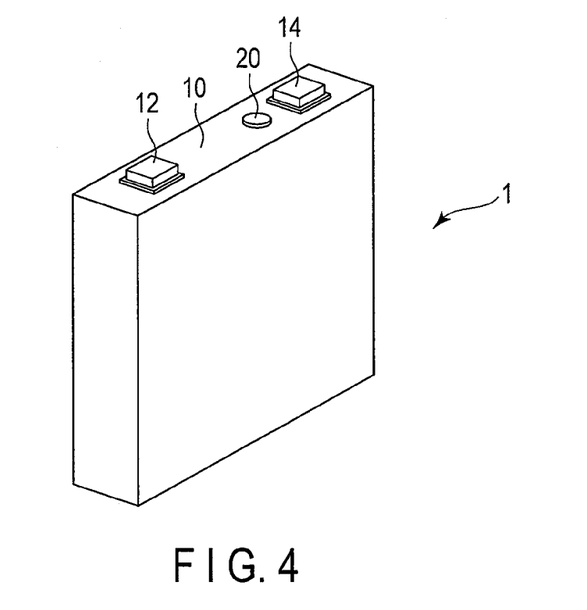
FIG. 4 is a perspective view showing appearance of the nonaqueous electrolyte secondary battery illustrated in FIG. 1.

FIG. 4 is a perspective view showing appearance of a nonaqueous electrolyte secondary battery. As described above, an electrode group 32 is accommodated in a battery container 31, the opening thereof is sealed with a sealing member 37 and an electrolyte solution is injected through an electrolyte solution inlet 19, followed by plugging the electrolyte solution inlet 19 with a sealing plug 20.

Next, materials for a positive electrode active material, a negative electrode active material, a separator, a nonaqueous electrolyte solution, a battery container, and an insulation member (vibration absorbing member) will be described.

A positive electrode active material is not particularly limited, and includes various oxides, for example, lithium-containing cobalt oxide (for example, $LiCoO_2$), manganese dioxide, lithium manganese complex oxide (for example, $LiMn_2O_4$, $LiMnO_2$), lithium-containing nickel oxide (for example, $LiNiO_2$), lithium-containing nickel cobalt oxide (for example, $LiNi_{0.8}Co_{0.2}O_2$), lithium-containing iron oxide, lithium-containing vanadium oxide, and chalcogen compounds such as titanium disulfide and molybdenum disulfide.

A negative electrode active material is not particularly limited, and includes, for example, graphitic materials or carbonaceous materials (for example, graphite, coke, carbon fiber, spherical carbon, carbonaceous material prepared by gas phase thermal decomposition, and resin sintered body), chalcogen compounds (for example, titanium disulfide, molybdenum disulfide, and niobium selenide), light metals (for example, aluminum, aluminum alloy, magnesium alloy, lithium, and lithium alloy), and lithium titanium oxide (for example, lithium titanate spinel).

A separator is not particularly limited, and for example, a microporous membrane, a fabric, a nonwoven fabric, and laminated products of the same material or different materials thereof can be used. Materials for forming the separator include polyethylene, polypropylene, an ethylene-propylene copolymer, an ethylene-butene copolymer, and cellulose.

A nonaqueous electrolyte solution is prepared by dissolving an electrolyte (for example, lithium salt) in a nonaqueous solvent. The nonaqueous solvents include, for example, ethylene carbonate (EC), propylene carbonate (PC), butylene carbonate (BC), dimethyl carbonate (DMC), diethyl carbonate (DEC), ethyl methyl carbonate (EMC), γ-butyrolactone (γ-BL), sulfolane, acetonitrile, 1,2-dimethoxyethane, 1,3-dimethoxypropane, dimethyl ether, tetrahydrofuran (THF), and 2-methyltetrahydrofuran. The nonaqueous solvent can be used singly or as a mixture of two or more solvents. An electrolyte includes lithium salts such as, for example, lithium perchlorate ($LiClO_4$), lithium hexafluorophsphate ($LiPF_6$), lithium tetrafluoroborate ($LiBF_4$), lithium hexafluoroarsenate ($LiAsF_6$), and lithium trifluoromethanesulfonate ($LiCF_3SO_3$). The electrolyte may be used singly or as a mixture of two or more electrolytes. An amount of the electrolyte dissolved in the nonaqueous solvent is preferably from 0.2 mol/L to 3 mol/L. As the electrolyte concentration is too low, sufficient ion conductivity may not be obtained. To the contrary, as the concentration is too high, the electrolyte may not be fully dissolved in the electrolyte solution.

For a battery container, for example, aluminum, aluminum alloy, iron (Fe), nickel (Ni)-plated iron, and stainless steel (SUS) can be used. A positive terminal (positive electrode), a negative terminal (negative electrode), a positive electrode lead, and a negative electrode lead are formed by, for example, aluminum or aluminum alloy.

For resins used as an insulation member (vibration absorbing member), any resin which is not attacked by an electrolyte solution can be used, and for example, polyethylene, polypropylene, ethylene-vinyl acetate copolymer, ethylene-vinyl alcohol copolymer, ethylene-acrylic acid copolymer, ethylene-ethyl acrylate copolymer, ethylene-methyl acrylate copolymer, ethylene-methacryl acrylate copolymer, ethylene-methyl methacrylate copolymer, ionomers, polyacrylonitrile, polyvinylidene chloride, fluororesin such as polytetrafluoroethylene or polychlorotrifluoroethylene, polyphenylene ether and polyethylene terephthalate can be used. The resin can be used singly or as a mixture of a plurality of the resins. Among them, use of polypropylene, polyethylene, polyethylene terephthalate or fluororesin is preferred.

For inorganic materials contained in an insulation member (vibration absorbing member), water absorbents can be used. Examples of the water absorbents are zeolite, active alumina, silica gel and activated carbon. An example of the zeolite is a molecular sieve. The inorganic material can be used singly or as a mixture of a plurality of inorganic materials. Among them, use of zeolite is preferred. A content percentage of the inorganic materials contained in the vibration absorbing member are preferably between 10% by mass and 60% by mass. As the content percentage of the inorganic material is too low, mechanical and thermal properties of the vibration absorbing member may not be improved. As the content percentage of the inorganic materials is too high, the mixture may not be molded.

A method for processing an insulation member (vibration absorbing member) is not particularly limited, and includes resin molding. A shaping method includes machining, injection molding and extrusion molding.

In mechanical properties of an insulation member (vibration absorbing member), the bending elastic modulus determined by the procedure defined by JIS K7203-1982 is preferably between 600 MPa and 1,500 MPa. Mechanical properties of the insulation member (vibration absorbing member) can be determined by taking out the insulation member (vibration absorbing member) from a battery container, followed by injection molding the insulation member once again in a shape defined by JIS K7203-1982 to form a test piece, and performing a bend test by the procedure defined by JIS K7203-1982. If the bending elastic modulus is too high, the vibration absorbing member becomes brittle and may break when applying shock and vibration. To the contrary, if the bending elastic modulus is too low, the vibration absorbing member cannot absorb vibration, resulting in breaking of the lead.

A specific heat of an insulation member (vibration absorbing member) is preferably between 0.25 cal/° C.·g and 0.40 cal/° C.·g. If the specific heat is too low, heat of friction between the vibration absorbing member and the exterior portion generated by vibration is likely to warm up the vibration absorbing member. The warm-up may lower the strength of the vibration absorbing member. To the contrary, if the specific heat is too high, heat of friction between the vibration absorbing member and the exterior portion generated by vibration warms up the vibration absorbing member which is slow to cool down, resulting in lowering of the strength of the vibration absorbing member.

The thermal conductivity of an insulation member (vibration absorbing member) is preferably between 0.3 W/m·K and 0.6 W/m·K. If the thermal conductivity is too low, frictional heat generated by vibration may not be released, warming up the vibration absorbing member resulting in lowering of the strength of the vibration absorbing member. If the thermal conductivity is too high, heat may be easily transferred from outside.

According to embodiments, an electrode group can be retained at an appropriate strength by an insulation absorbing member, improving the resistance of a nonaqueous electrolyte secondary battery to shock and vibration.

EXAMPLES

Hereinafter, examples will be described.

Preparation of Positive Electrode

As a positive electrode active material, $LiNi_{1/3}Co_{1/3}Mn_{1/3}O_2$ and $LiCoO_2$ were used and mixed in a 2:1 ratio of $LiNi_{1/3}Co_{1/3}Mn_{1/3}O_2$ to $LiCoO_2$. The positive electrode active material, acetylene black, graphite, and polyvinylidene fluoride were mixed in a ratio of 100:2:2:3 and kneaded to mix in a planetary mixer using N-methyl-2-pyrrolidone as a solvent to prepare slurry for a positive electrode. Thereafter, using a coater, the mixture was applied to an aluminum foil with thickness of 20 μm such that an amount of coat per unit area is 110 g/m$^2$, followed by rolling to adjust an electrode density of 3.4 g/cc using a roll press machine.

Preparation of Negative Electrode $Li_4Ti_5O_{12}$ was used as a negative electrode active material. The negative electrode active material, graphite, and polyvinylidene fluoride were mixed in a ratio of 100:5:3 and kneaded to mix in a planetary mixer using N-methyl-2-pyrrolideon as a solvent to prepare slurry for a negative electrode. Thereafter, using a coater, the mixture was applied to an aluminum foil with thickness of 12 μm such that an amount of coat per unit area was adjusted to 110 g/m$^2$, followed by rolling to adjust an electrode density of 2.4 g/cc using a roll press machine.

Preparation of Electrode Group

Using a winding machine, the positive electrode, the negative electrode and a cellulose separator with thickness of 30 μm were wound, to an end of which an adhesive tape was adhered to yield an electrode group 32.

Example 1

As illustrated in FIG. 1, a positive terminal (positive electrode) 12 and a positive electrode tab 3a of an electrode group 32 were electrically connected by welding with a lead 35. Similarly, a negative terminal (negative electrode) 14 and a negative electrode tab 4a of the electrode group 32 were electrically connected by welding with a lead 36. Hereby, the electrode group 32 was integrated with a sealing member 37. Further, insulation members (vibration absorbing member) 40, 41 are applied for cover on leads 35, 36 and tabs 3a, 4a. Thereafter, the insulation members (vibration absorbing member) 40 and 41 and the electrode group 32 are fixed by two-folded insulating tapes 38 and 39. Then, the electrode group 32, the sealing member 37, the insulation members (vibration absorbing member) 40 and 41 and the like, integrated together as one body are inserted into a battery container 31, and the contact portion between the cover 10 and the battery container 31 is welded with laser beam.

A vibration absorbing member was produced by mixing polyethylene as a resin with 4A molecular sieve available from Union Showa K.K. in a proportion of 40% by mass, followed by injection molding the mixture. The vibration absorbing member had the bending elastic modulus of 600 MPa, the specific heat of 0.4 cal/° C.·g, and the thermal conductivity of 0.6 W/m·K.

An electrolyte solution was added through an inlet, which was sealed by welding with laser beam to yield a nonaqueous electrolyte secondary battery with the rated capacity of 20 Ah. In an electrolyte solution, a 1:1 mixture of ethylene carbonate and dimethyl carbonate was used as a nonaqueous solvent and a 2 mol/L solution of lithium hexafluorophosphate was used as an electrolyte. The physical dimensions of the battery were 18.0 cm in width, 2.3 cm in thickness, and 10.0 cm in height (terminal not included).

Twenty samples of nonaqueous electrolyte secondary batteries were prepared and subjected to the vibration test in accordance with UN-T3 testing, demonstrating neither voltage drop nor abnormal heat generation. The battery was disassembled to take out a vibration absorbing member, which did not show any defect such as crack. No breakage in positive electrode and negative electrode leads was found.

Example 2

In Example 2, a vibration absorbing member was produced by mixing polypropylene as a resin with 4A molecular sieve available from Union Showa K.K. in a proportion of 60% by mass, followed by injection molding the mixture.

The vibration absorbing member had the bending elastic modulus of 800 MPa, the specific heat of 0.3 cal/° C.·g, and the thermal conductivity of 0.4 W/m·K.

Using the similar procedure to Example 1, a nonaqueous electrolyte secondary battery of Example 2 was prepared. Twenty samples of nonaqueous electrolyte secondary batteries were prepared and subjected to the vibration test in accordance with UN-T3 testing, demonstrating neither voltage drop nor abnormal heat generation. The battery was disassembled to take out the vibration absorbing member, which did not show any defect such as crack. No breakage in positive electrode and negative electrode leads was found.

Example 3

In Example 3, a vibration absorbing member was produced by mixing polypropylene as a resin with 4A molecular sieve available from Union Showa K.K. in a proportion of 10% by mass, followed by injection molding the mixture.

The vibration absorbing member had the bending elastic modulus of 1,100 MPa, the specific heat of 0.4 cal/° C.·g, and the thermal conductivity of 0.3 W/m·K.

Using the similar procedure to Example 1, a nonaqueous electrolyte secondary battery of Example 3 was prepared. Twenty samples of nonaqueous electrolyte secondary batteries were prepared and subjected to the vibration test in accordance with UN-T3 testing, demonstrating neither voltage drop nor abnormal heat generation. The battery was disassembled to take out the vibration absorbing member, which did not show any defect such as crack. No breakage in positive electrode and negative electrode leads was found.

Example 4

In Example 4, a vibration absorbing member was produced by mixing polypropylene as a resin with 4A molecular sieve available from Union Showa K.K. in a proportion of 10% by mass, followed by injection molding the mixture.

The vibration absorbing member had the bending elastic modulus of 1,100 MPa, the specific heat of 0.4 cal/° C.·g, and the thermal conductivity of 0.3 W/m·K.

Using the similar procedure to Example 1, a nonaqueous electrolyte secondary battery of Example 4 was prepared. Twenty samples of nonaqueous electrolyte secondary batteries were prepared and subjected to the vibration test in accordance with UN-T3 testing, demonstrating neither voltage drop nor abnormal heat generation. The battery was disassembled to take out the vibration absorbing member, which did not show any defect such as crack. No breakage in positive electrode and negative electrode leads was found.

Example 5

In Example 5, a vibration absorbing member was produced by mixing polypropylene as a resin with 13X molecular sieve available from Union Showa K.K. in a proportion of 60% by mass, followed by injection molding the mixture.

The vibration absorbing member had the bending elastic modulus of 800 MPa, the specific heat of 0.3 cal/° C.·g, and the thermal conductivity of 0.4 W/m·K.

Using the similar procedure to Example 1, a nonaqueous electrolyte secondary battery of Example 5 was prepared. Twenty samples of nonaqueous electrolyte secondary batteries were prepared and subjected to the vibration test in accordance with UN-T3 testing, demonstrating neither voltage drop nor abnormal heat generation. The battery was disassembled to take out the vibration absorbing member, which did not show any defect such as crack. No breakage in positive electrode and negative electrode leads was found.

Example 6

In Example 6, a vibration absorbing member was produced by mixing polyethylene terephthalate as a resin with 4A molecular sieve available from Union Showa K.K. in a proportion of 30% by mass, followed by injection molding the mixture.

The vibration absorbing member had the bending elastic modulus of 1,500 MPa, the specific heat of 0.25 cal/° C.·g, and the thermal conductivity of 0.3 W/m·K.

Using the similar procedure to Example 1, a nonaqueous electrolyte secondary battery of Example 6 was prepared. Twenty samples of nonaqueous electrolyte secondary batteries were prepared and subjected to the vibration test in accordance with UN-T3 testing, demonstrating neither voltage drop nor abnormal heat generation. The battery was disassembled to take out the vibration absorbing member, which did not show any defect such as crack. No breakage in positive electrode and negative electrode leads was found.

Example 7

In Example 7, a vibration absorbing member was produced by mixing polypropylene as a resin with 4A molecular sieve and 13X molecular sieve as zeolite available from Union Showa K.K. in a proportion of 20% by mass each, followed by injection molding the mixture.

The vibration absorbing member had the bending elastic modulus of 1,100 MPa, the specific heat of 0.4 cal/° C.·g, and the thermal conductivity of 0.3 W/m·K.

Using the similar procedure to Example 1, a nonaqueous electrolyte secondary battery of Example 7 was prepared. Twenty samples of nonaqueous electrolyte secondary batteries were prepared and subjected to the vibration test in accordance with UN-T3 testing, demonstrating neither voltage drop nor abnormal heat generation. The battery was disassembled to take out the vibration absorbing member, which did not show any defect such as crack. No breakage in positive electrode and negative electrode leads was found.

Comparative Example 1

In Comparative Example 1, a vibration absorbing member was produced by using polypropylene alone.

The vibration absorbing member had the bending elastic modulus of 900 MPa, the specific heat of 0.55 cal/° C.·g, and the thermal conductivity of 0.38 W/m·K.

Using the similar procedure to Example 1, a nonaqueous electrolyte secondary battery of Comparative Example 1 was prepared. Twenty samples of nonaqueous electrolyte secondary batteries were prepared and subjected to the vibration test in accordance with UN-T3 testing, demonstrating that no abnormal heat generation was found but an increase of the resistance was observed in 7 test samples. The battery was disassembled to take out the vibration absorbing member which did not show any defect such as crack, but positive electrode and negative electrode leads were broken.

Comparative Example 2

In Comparative Example 2, a vibration absorbing member was produced by using polytetrafluoroethylene alone.

The vibration absorbing member had the bending elastic modulus of 550 MPa, the specific heat of 0.25 cal/° C.·g, and the thermal conductivity of 0.23 W/m·K.

Using the similar procedure to Example 1, nonaqueous electrolyte secondary battery of Comparative Example 2 was prepared. Twenty samples of nonaqueous electrolyte secondary batteries were prepared and subjected to the vibration test in accordance with UN-T3 testing, demonstrating that no abnormal heat generation was found but an increase of the resistance was observed in 12 test samples. The battery was disassembled to take out the vibration absorbing member which did not show any defect such as crack, but positive electrode and negative electrode leads were broken.

Comparative Example 3

In Comparative Example 3, a vibration absorbing member was produced by using polyethylene terephthalate alone.

The vibration absorbing member had the bending elastic modulus of 2,100 MPa, the specific heat of 0.3 cal/° C.·g, and the thermal conductivity of 0.15 W/m·K.

Using the similar procedure to Example 1, a nonaqueous electrolyte secondary battery of Comparative Example 3 was prepared. Twenty samples of nonaqueous electrolyte secondary batteries were prepared and subjected to the vibration test in accordance with UN-T3 testing, demonstrating that no abnormal heat generation was found but an increase of the resistance was observed in 15 test samples. The battery was disassembled to take out the vibration absorbing member which did not show any defect such as crack, but positive electrode and negative electrode leads were broken.

According to Examples, when shock and vibration are applied to a battery, heat of friction between an electrode group and a vibration absorbing member is likely to be released so that it is possible to prevent the electrode group from vibration without lowering the strength of the vibration absorbing member. An inorganic material included in the vibration absorbing member allows for absorbing oxidation gas and moisture inside the battery, thereby enabling to extend the service life and to improve the reliability.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A nonaqueous electrolyte secondary battery comprising:
    an electrode group comprising a positive electrode, a negative electrode and a separator disposed between the positive electrode and the negative electrode;
    a battery container in which the electrode group is accommodated;
    an insulation member which insulates the positive electrode and the negative electrode from the battery container and absorbs vibration; and
    a nonaqueous electrolyte solution in which the electrode group accommodated in the battery container is immersed,
    wherein the insulation member comprises a resin and an inorganic material, the insulation member having a bending elastic modulus of 600 MPa or more and 1,500 MPa or less, a specific heat of 0.25 cal/° C.·g or more and 0.40 cal/° C.·g or less, and a thermal conductivity of 0.3 W/m·K or more and 0.6 W/m·K. or less.

2. The nonaqueous electrolyte secondary battery according to claim 1, wherein the resin is at least one selected from the group consisting of polyethylene, polypropylene, ethylene-vinyl acetate copolymer, ethylene-vinyl alcohol copolymer, ethylene-acrylic acid copolymer, ethylene-ethyl acrylate copolymer, ethylene-methyl acrylate copolymer, ethylene-methacryl acrylate copolymer, ethylene-methyl methacrylate copolymer, ionomers, polyacrylonitrile, polyvinylidene chloride, polytetrafluoroethylene, polychlorotrifluoroethylene, polyphenylene ether and polyethylene terephthalate.

3. The nonaqueous electrolyte secondary battery according to claim 1, wherein the resin is at least one selected from the group consisting of polyethylene, polypropylene, polyethylene terephthalate and fluororesin.

4. The nonaqueous electrolyte secondary battery according to claim 1, wherein the insulation member comprises 10% by mass or more and 60% by mass or less of the inorganic material.

5. The nonaqueous electrolyte secondary battery according to claim 1, wherein the inorganic material is at least one selected from the group consisting of zeolite, active alumina, silica gel and activated carbon.

6. The nonaqueous electrolyte secondary battery according to claim 1, wherein the inorganic material is zeolite.

7. The nonaqueous electrolyte secondary battery according to claim 1, wherein the positive electrode comprised a positive electrode active material selected from the group consisting of lithium-containing cobalt oxide, manganese dioxide, lithium manganese complex oxide, lithium-containing nickel oxide, lithium-containing nickel cobalt oxide, lithium-containing iron oxide, lithium-containing vanadium oxide, titanium disulfide, and molybdenum disulfide.

8. The nonaqueous electrolyte secondary battery according to claim 1, wherein the negative electrode comprised a negative electrode active material selected from the group consisting of graphitic materials, carbonaceous materials, chalcogen compounds, light metals, and lithium titanium oxide.

9. The nonaqueous electrolyte secondary battery according to claim 1, wherein the nonaqueous electrolyte solution comprises an electrolyte selected from the group consisting of lithium perchlorate, lithium hexafluorophosphate, lithium tetrafluoroborate, lithium hexafluoroarsenate, and lithium trifluoromethanesulfonate.

10. The nonaqueous electrolyte secondary battery according to claim 1, wherein the nonaqueous electrolyte solution comprises a nonaqueous solvent selected from the group consisting of ethylene carbonate, propylene carbonate, butylene carbonate, dimethyl carbonate, diethyl carbonate, ethyl methyl carbonate, γ-butyrolactone, sulfolane, acetonitrile, 1,2-dimethoxyethane, 1,3-dimethoxypropane, dimethyl ether, tetrahydrofuran, and 2-methyltetrahydrofuran.

* * * * *